United States Patent [19]

Gradl et al.

[11] Patent Number: 4,678,650

[45] Date of Patent: Jul. 7, 1987

[54] PROCESS FOR MAKING AN ALKALI PHOSPHATE SOLUTION

[75] Inventors: Reinhard Gradl; Gero Heymer, both of Erftstadt, Fed. Rep. of Germany

[73] Assignee: Hoechst Aktiengesellschaft, Fed. Rep. of Germany

[21] Appl. No.: 715,167

[22] Filed: Mar. 22, 1985

[30] Foreign Application Priority Data

Apr. 6, 1984 [DE] Fed. Rep. of Germany ....... 3413020

[51] Int. Cl.$^4$ .............................................. C01B 15/16
[52] U.S. Cl. .................................... 423/309; 423/310; 423/313
[58] Field of Search ........................ 423/309, 310, 313

[56] References Cited

U.S. PATENT DOCUMENTS

| | | | |
|---|---|---|---|
| 3,872,215 | 3/1975 | Cherdron et al. | 423/309 |
| 4,112,118 | 9/1978 | Cussons et al. | 423/313 |
| 4,117,092 | 9/1978 | Beltz et al. | 423/313 X |
| 4,132,540 | 1/1979 | Edwards et al. | 423/310 X |
| 4,313,826 | 2/1982 | Gradl et al. | 210/540 X |
| 4,481,175 | 11/1984 | Jino et al. | 423/309 X |

FOREIGN PATENT DOCUMENTS 0022186 1/1981 European Pat. Off. .

Primary Examiner—Andrew H. Metz
Assistant Examiner—William G. Wright
Attorney, Agent, or Firm—Connolly and Hutz

[57] ABSTRACT

An aqueous alkali phosphate solution is made. An organic phase is countercurrently mixed with an aqueous phase, the two phases being used in a volume ratio larger than 1:1 and formed aqueous alkali phosphate solution is separated from the remaining organic phase. The two phases are mixed and reacted in a reaction zone comprised of a mixing and separating zone. The organic phase is continuously dispersed in the aqueous phase. A volume excess of aqueous phase is maintained in the mixing zone and the two phases are used in an overall quantity sufficient to provide a volume ratio of organic to aqueous phase of 4:6 to 2:8.

3 Claims, No Drawings

PROCESS FOR MAKING AN ALKALI PHOSPHATE SOLUTION

The present invention relates to a process for making an aqueous alkali phosphate solution wherein phosphoric acid in a solvent immiscible or only partially miscible with water is mixed with an aqueous phase consisting of an alkali metal solution in water, the organic phase and aqueous phase being used in a volume ratio of 10:1–20:1, and the formed aqueous alkali metal phosphate solution is separated from the remaining organic phase.

It has already been described that alkali metal phosphate solutions can be made by subjecting a phosphoric acid solution obtained by subjecting e.g. wet process phosphoric acid with an organic solvent to countercurrent extraction using an aqueous alkali metal solution, cf. German Specification No. DE-B2-18 11 813.

This method is however beset with a series of disadvantages. The aqueous solutions containing phosphate ions and alkali metal ions used for reextraction shall present a distinctly acid pH-value. In addition, the quantity of alkali metal ions present, based on the existing phosphate ions, shall not significantly go beyond the ratio corresponding to that of monoalkali metal phosphate, i.e. it is not possible in this process to make neutral or alkaline alkali metal phosphate solutions.

In order to avoid the formation of emulsions during reextraction, it is necessary for recycled solvent to be subjected to an elaborate two-stage scrubbing treatment.

As can be inferred from this, a three stage apparatus is required to be used for effecting the reextraction and a still further stage has to be employed for effecting the neutralization with sodium carbonate.

It is therefore highly desirable to improve the prior art processes so as to avoid the disadvantages which are associated therewith.

To this end, the present invention provides for the standard procedure customarily used to be inversed, namely for the organic phase considerably larger in volume than the aqueous phase to be dispersed therein and for this latter phase to be used as the continuous phase.

To achieve this, the invention provides:

(a) for the two phases to be mixed and simultaneously reacted in at least one reaction zone formed in each case with a mixing zone and separating zone, the mixing zone whose upper end terminates inside or immediately below the separating zone, communicating directly with the separating zone;

(b) for the organic phase to be continuously dispersed in the aqueous phase by introducing, prior to starting the reaction, an aqueous alkali phosphate solution having the composition targeted for the final product into the mixing and separating zones;

(c) for a volume excess of aqueous phase to be maintained in the mixing zone by introducing feed phase into, and taking effluent phase from, the reaction zone in quantities sufficient for the layer separating the two phases from one another to reach considerably beyond the upper end portion of the mixing zone; and (d) for the two phases to be introduced into the reaction zone in a total quantity sufficient to provide a volume ratio of organic phase to aqueous phase of 4:6 to 2:8, in the mixing zone.

The reaction should conveniently be effected in a reaction zone comprising an agitator-provided column or pulsating sieve tray column or a mixer/settler unit (cf. European Patent Specification No. 0 022 186).

In the event of the reaction zone being a column, it is good practice to introduce the feed materials thereinto approximately in the column center portion, the alkali metal solution being preferably admitted at a level above the phosphoric acid inlet. The alkali phosphate solution is ultimately removed from the column's bottom portion whilst the organic solvent retained after reaction is removed overhead.

It is particularly advantageous to carry out the present process in an existing column, e.g. in a column as used for making organic phosphoric acid (feed acid) by extracting crude phosphoric acid with an organic solvent.

The steps of this invention would not have been expected by the artisan to produce the effect described, for the following reason: the formation of the alkali phosphate solution is a result of the chemical reaction which occurs between phosphoric acid ions and alkali ions present in the aqueous solution, but not of an extraction during which the phosphoric acid is converted from the organic phase to the aqueous phase in accordance with the law of distribution.

A further unexpected result which could not be foreseen resides in that it is possible in this way completely to avoid the difficulties which normally accompany this reaction, namely an encrustation by alkali metal phosphate crystallizing out.

Further advantages of the process of this invention reside in the following: solvent freed from phosphoric acid coming from the reaction zone is completely clear, not turbid; temporary variations in the quantities of alkali metal solution or organic phosphoric acid solution admitted per unit time to the mixing system do not affect the yield or alkali metal/phosphate-ratio nor entail encrustation; alkali phosphate solutions more highly concentrated than those made by prior processes are obtained as final products.

The term alkali phosphate solutions as used herein comprises solutions of orthophosphates of ammonium, potassium and preferably sodium, presenting an ammonium or alkali metal/phosphorus ratio of 1:1–2:1. In the case of sodium, it is possible, for example, to produce a monosodiumdihydrogen phosphate solution or disodiumhydrogenphosphate solution or any desirable mixture thereof, preferably however a mixture presenting a Na:P-molar ratio of 5:3, such as required for the manufacture of pentasodium triphosphate.

The organic phosphoric acid solutions used in accordance with this invention are normally obtained by subjecting crude phosphoric acid to liquid/liquid-extraction using an organic solvent, the resulting extract being commonly scrubbed subsequently with an aqueous solution so as to be freed from minor residual quantities of impurities. The organic solvents which are preferably used include phosphoric acid esters, or alkyl alcohols with alkyl groups having a chain length $C \geq 4$, e.g. tributyl phosphate, butanol and pentanol. The phosphoric acid concentration in the organic solvent generally varies between 3 and 25 wgt % $P_2O_5$.

A hydroxide, carbonate or phosphate should conveniently be used as the alkali component. Sodium hydroxide solutions of 30–70% strength, preferably 50% strength, should advantageously be used for making sodium phosphate solutions. Ammonium compounds can be made using an aqueous ammonium hydroxide, carbonate or phosphate solution or gaseous ammonia in combination with a suitable quantity of water.

Involved in the process of this invention is a chemical reaction but no extraction so that it is possible for it to be generally carried out in a single processing stage.

The following examples illustrate the invention which is not limited thereto.

EXAMPLES

Crude phosphoric acid prepared by processing North African phosphate ore with sulfuric acid was initially treated with lime and active carbon for reducing its sulfate content and content of organic impurities. Next, the acid so pretreated was extracted in a multistage mixer/settler-unit with a mixture of n-pentanol and iso-amyl alcohol using sulfuric acid as an extraction aid. An organic extract containing practically the entire quantity of crude acid together with minor quantities of impurities originating from the crude phosphate was obtained. This crude extract was introduced into a multistage mixer/settler-unit and countercurrently scrubbed therein with a small quantity of water, and the scrubbing liquid formed was recycled into the extraction stage. In this way, a purified phosphoric acid dissolved in the organic solvent was obtained. This solvent phase containing phosphoric acid was used as feed material in the following experiments.

EXAMPLE 1

The mixing and separating zones forming part of a mixer/settler-unit such as that described in EP-00 22 186 were filled with an aqueous monosodium phosphate solution. Next, 6.3 l/h solvent phase containing phosphoric acid as described above which came from the scrubbing stage and contained 9 wgt % $P_2O_5$ and 0.34 l/h aqueous sodium hydroxide solution (50% NaOH) were jointly metered into the mixer of the reactor. The organic phase was dispersed whilst the aqueous phase remained the continuous phase. 1446 g/h monosodium phosphate solution containing 32.0 wgt % $P_2O_5$ was removed from the lower end of the separator whereas solvent with a residual content of 0.043 wgt % $P_2O_5$ ran off from the upper portion of the separator. The solvent phase and monosodium phosphate solution were completely clear. Less than 100 ppm (volume) aqueous phase was removed together with the organic phase (entrainment). Encrustation by compounds crystallizing out during the reaction was not observed.

EXAMPLE 2

A quantity of alcoholic phosphoric acid solution the same as that used in Example 1 was reacted in the manner there described with 485 ml/h sodium hydroxide solution. A sodium phosphate solution containing Na and P in a molar ratio of 1.34:1 and 29.4 wgt % $P_2O_5$ was obtained. The alcohol running off had a residual $P_2O_5$-content of 0.012 wgt % and less than 100 ppm (volume) aqueous phase was entrained. Disturbance or encrustation during the reaction was not observed.

EXAMPLE 3

A quantity of alcoholic phosphoric acid solution the same as that used in Example 1 was reacted in the manner there described with 595 ml/h sodium hydroxide solution. A sodium phosphate solution containing Na and P in a molar ratio of 1.667:1 and 27.2 wgt % $P_2O_5$ was obtained. This solution can directly be used e.g. for making pentasodium tripolyphosphate. The remaining alcohol had a residual $P_2O_5$-content of 0.012 wgt %; entrainment was not measurable. The reaction was not disturbed.

EXAMPLE 4

A quantity of alcoholic phosphoric acid solution the same as that used in Example 1 was reacted in the manner there described with 1400 ml of a 10 wgt % sodium hydroxide solution. A disodium phosphate solution containing 20.1% wgt $P_2O_5$ was obtained. The alcohol running off contained 0.011 wgt % $P_2O_5$ and about 100 ml (volume) entrainment. Crusts sometimes found to form near the inlet for sodium hydroxide solution dissolved rapidly in the phosphate salt solution.

EXAMPLE 5 (COMPARATIVE EXAMPLE)

Example 1 was repeated using the same quantities and concentration ratios and mixer/settler-unit, but the organic phosphoric acid solution and sodium hydroxide solution were simultaneously introduced into the empty apparatus. As a result of the large excess of organic phase over the sodium hydroxide solution, the mixing zone filled with alcohol; the aqueous phase was dispersed by agitation and the organic phase remained continuous. The monosodium phosphate solution so obtained contained 30.6 wgt % $P_2O_5$. The alcohol running off was turbid and had a residual $P_2O_5$-content of 0.84 wgt %. 0.1 wgt % was entrainment.

EXAMPLES 6 AND 7 (COMPARATIVE EXAMPLES)

The experiments described in Examples 2 and 3 were repeated but the organic phase was in each case kept continuous and the aqueous phase was dispersed therein; to this end, the phase boundary surface was kept distinctly below the upper edge of the mixing zone. in Example 6 (comparative to Example 2), a sodium phosphate solution the Na/P-molar ratio of which varied distinctly between 1.2 and 1.5:1 during the experiment, was still obtained but solid particles partially appeared in it; the alcohol running off had a residual $P_2O_5$-content of 0.95 wgt %; in Example 7 (comparative to Example 3) it was necessary for the experiment to be prematurely discontinued due to encrustations near the feed inlet for sodium hydroxide solution which made sufficient dosage impossible.

EXAMPLE 8

An aqueous ammonium phosphate solution which had a pH-value of 6 was introduced into the mixing and separating zones of the mixer/settler-unit already described. Next, 3.2 l/h of the above solvent phase containing phosphoric acid coming from the scrubbing stage with a $P_2O_5$-content of 10.7 wgt % was introduced into the mixing zone simultaneously with 0.34 l/h distilled water and gaseous ammonia. The ammonia was used in a quantity sufficient for maintaining a pH-value of 5.8 in the mixer. The phase boundary surface in the separator was kept distinctly above the upper edge of the mixer so that the aqueous phase was the continuous phase in which the organic phase was dispersed. An ammonium phosphate solution containing 30.2 wgt % $P_2O_5$ was removed near the lower end of the separator and a clear alcohol phase with a residual $P_2O_5$-content of 0.07% ran off from the upper portion of the separator.

EXAMPLE 9 (COMPARATIVE EXAMPLE)

An ammonium phosphate solution was prepared with the same quantities of materials as in Example 8 but the phase boundary surface was kept below the upper edge of the mixing zone. Solid matter commenced forming in the organic phase which in this case was the continuous phase, already at a pH-value of about 5, and the reaction was considerably affected. The effluent aqueous phase just contained 26.8 wgt % $P_2O_5$ whereas the organic phase contained about 1.9 wgt % dissolved $P_2O_5$. In other words, the reaction was not complete despite the use of ammonia in excess.

Even in the event of the mixing zone being filled with the aqueous alkali solution, prior to starting the reaction, phosphates crystallizing out give rise to strong encrustation so that it is necessary for the reaction to be arrested after a short while.

We claim:

1. In the process for making an aqueous alkali phosphate solution wherein an organic phase comprising a solution of phosphoric acid in a solvent immiscible or only partially miscible with water is countercurrently mixed with an aqueous phase containing an alkali compound dissolved therein, the organic phase and aqueous phase being used in a volume ratio larger than 1:1, and the resulting aqueous alkali phosphate solution being separated from the remaining organic phase, the improvement which comprises:
   (a) mixing and simultaneously reacting the said two phases fed into at least one reaction zone comprising in each case a mixing zone and separating zone, the upper end of said mixing zone terminating inside or immediately below the separating zone and said mixing zone communicating directly with the separating zone;
   (b) continuously dispersing in the aqueous phase the organic phase being in total larger in volume than the aqueous phase by introducing, prior to starting the reaction, an aqueous alkali phosphate solution having the composition desired for the final product into the mixing and separating zones;
   (c) maintaining a volume excess of aqueous phase in the mixing zone by introducing feed material into the mixing zone and taking effluent material from the reaction zone in quantities sufficient for the layer separating the two phases from one another to reach considerably beyond the upper end portion of the mixing zone; and
   (d) feeding the said two phases into the reaction zone in an overall quantity sufficient to provide a volume ratio of organic phase to aqueous phase of 4:6 to 2:8, in the mixing zone.

2. The process as claimed in claim 1, wherein the reaction is effected in a reaction zone designed as a mixer/settler unit.

3. The process as claimed in claim 1, wherein the reaction is effected in a reaction zone designed as a pulsating sieve tray column or as a column provided with an agitator.

* * * * *